C. J. COLEMAN.
RAILWAY TRAFFIC CONTROLLING APPARATUS.
APPLICATION FILED JUNE 8, 1906.
1,181,993.
Patented May 9, 1916.
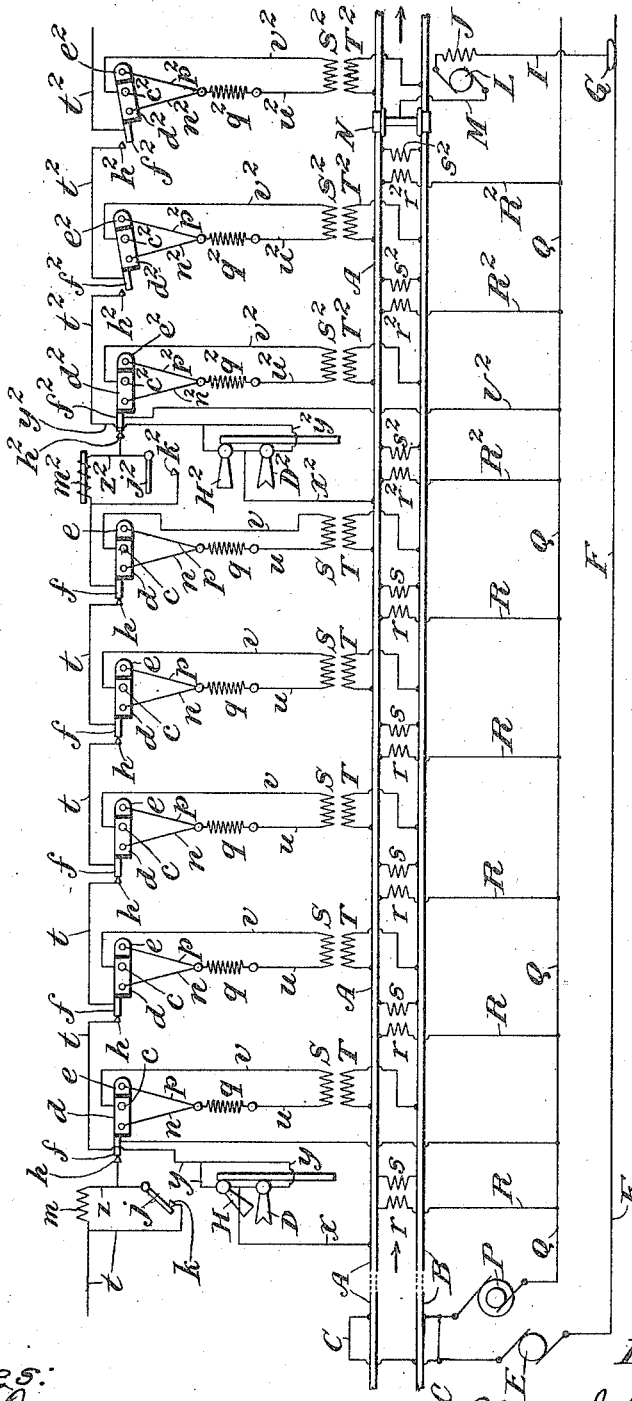
Witnesses:
Albert T. Day
Bernard Cowen
Inventor:
Clyde J. Coleman
by Henry D. Williams
Atty.

UNITED STATES PATENT OFFICE.

CLYDE J. COLEMAN, OF NEW YORK, N. Y., ASSIGNOR, BY MESNE ASSIGNMENTS, TO HALL SWITCH & SIGNAL COMPANY, OF NEW YORK, N. Y., A CORPORATION OF MAINE.

RAILWAY-TRAFFIC-CONTROLLING APPARATUS.

1,181,993.  Specification of Letters Patent.  Patented May 9, 1916.

Application filed June 8, 1906. Serial No. 320,742.

*To all whom it may concern:*

Be it known that I, CLYDE J. COLEMAN, a citizen of the United States, residing at the borough of Manhattan, city of New York, in the county of New York and State of New York, have invented certain new and useful Improvements in Railway-Traffic-Controlling Apparatus, of which the following is a specification, reference being had therein to the accompanying drawing, forming a part thereof.

My invention relates in general to electrically controllable traffic-controlling or signaling apparatus for railways and relates particularly to traffic-controlling or signaling apparatus for electric railways which employ the track rails as return conductors for the motive power or traction current.

The objects of my invention, broadly designated, are, reliability and simplicity of operation, economy and simplicity of maintenance, and economy and simplicity of construction.

More particularly stated, it is one object of my invention to economize in the consumption of traffic-controlling or signaling current and to reduce so far as possible the resistance losses of traction current in the return path thereof including the traction rails.

To the foregoing and other ends, my invention comprises various features and combinations of features, all appearing clearly in the light of the following description of that particular embodiment of my invention which I have illustrated in the accompanying drawings. Several broad features of invention will, however, now be set forth in general terms.

In the accompanying diagram I have represented the rails A and B of a portion of a single track railway, though my invention is not limited to a single track railway, including one complete signaling block and a portion of a second signaling block in advance thereof. The first signaling block of the diagram is demarcated by home-and-distant signaling apparatuses at its rear and advance ends, the rear signaling apparatus including home and distant signal semaphores H and D, respectively, and the advance signaling apparatus including home and distant signal semaphores $H^2$ and $D^2$, respectively. I have represented the power station as located some distance in rear of the first signaling apparatus shown in the diagram. The power station includes a motive-power or traction current generator E and a traffic-controlling or signaling current generator P, the traction generator in this instance being represented as a direct current-generator and the traffic-controlling or signaling current generator being represented in this instance as an alternating current generator. One terminal of each generator is grounded on the track rails through a ground conductor C, and the opposite terminals of the traction and signal generators E and P are connected with respective feed wires or transmission lines F and Q extending out along the railway line. The traction current feeder F delivers traction current to the railway vehicles on the railway, one of which is represented by the wheels and axles N in the block in advance of the signals $H^2$, $D^2$, the complete motive-power circuit for such train being traceable as follows: from one terminal of the traction generator E through the traction current feeder F, which may be embodied in a third rail, thence through the contact shoe G carried by the railway vehicle, conductor I, motor field coils J, motor armature L, conductor M, grounded on the wheels and axles N, and from the wheels and axles N to the track rails A and B and thence rearward through such track rails to the grounded conductor C at the power station and through such conductor C back to the opposite terminal of the traction current generator E.

The track rails of each signaling block demarcated by adjacent signaling apparatuses are fed at various points throughout the block by a number of sources of traffic-controlling or signaling current, these sources in the present instance being embodied in the secondary coils of supply transformers, such secondary coils having their terminals connected directly with the opposite track rails and being marked *s* in the first signaling block of the diagram and $s^2$ in the second signaling block thereof. The primary coils of these transformers, marked *r* and $r^2$, in the first and second blocks respectively, are fed directly from the signaling current generator through circuits traceable as follows: from one terminal of the signaling current generator P to and through the signaling current feeder Q and thence through conductors R of the first signaling block and conductors R² of the second signaling block to the primary coils $r$ and $r^2$ of the first and second blocks respectively, and through such primary coils to the track rail A and thence to the grounded conductor C and back to the opposite terminal of the signaling current generator P. Thus the primary coils of the supply transformers are energized so as to develop E. M. F. in their respective secondary coils and effect an alternating difference of potential between the opposite track rails. The supply transformers are preferably located at equal intervals along the track and the primary coils of receiving transformers are bridged directly across the rails about midway between the supply transformers, such primary coils of the receiving transformers being marked T and T² in the first and second blocks respectively, and their respective secondary coils being marked S and S². The secondary coil of each receiving transformer is included in a local circuit comprising a hot-wire electro-translative device or circuit-controlling device consisting in a lever including three longitudinally successive sections, such as $f$, $d$ and $e$, insulated from each other and mounted upon a central pivot $c$ passing through the middle section $d$. Tension wires $n$ and $p$ are commonly connected to one end of a tension spring $q$, which is anchored at its opposite end, and the tension wires at their opposite ends are connected respectively with the sections $d$ and $e$ of the circuit-controlling or electro-translative lever. The extension or section $f$ of the lever coöperates with a stationary contact member $h$. The extremity of the extension $f$ makes a wiping contact with the contact member $h$ so that the extension $f$ may pass over and beyond the contact $h$ when the translating lever swings in either direction about its pivotal mounting $c$.

The circuit of the secondary coil S of the receiving transformer through the hot-wire translating device is traceable as follows: from one terminal of the secondary coil S, through the conductor $u$ to the anchorage of the spring $q$, thence through such spring and through the electro-translative conductor or tension wire $n$ to the section $d$ of the translating lever and through such section $d$ to the conductor $v$ and thence back to the opposite terminal of the secondary coil. The primary coil T of the receiving transformer is energized by alternating current transmitted to it through the rails from the secondary coils $s$ of the supply transformers on either side of the receiving transformer. Thus alternating E. M. F. is developed in the secondary coil S of the receiving transformer so as to maintain an alternating current through the foregoing local circuit including the electro-translative tension wire $n$ of the translating lever. By such alternating current the electro-translative wire $n$ is heated above the normal or extraneous temperature so as to be expanded considerably more than the compensating tension wire $p$ which is not subjected to any heating current whatsoever. The relative lengths of the wires $n$ and $p$ are so adjusted that, when the normal heating current is passing through the wire $n$, the translating lever will be in position to maintain contact between its extension $f$ and coöperating stationary contact $h$; but if the current in the electro-translative tension wire $n$ should be slightly diminished, the temperature of such tension wire would be slightly reduced so as to contract such wire and shorten its length relative to the compensating wire $p$, thereby causing the translating lever to swing about its pivotal axis and carry its contact extension $f$ below position of conductive contact with the coöperating contact piece $h$. The electro-translative tension wire $n$ and the compensating tension wire $p$ are made preferably of one material so as to have a common coefficient of thermal expansion and be subject to equal dimensional variations by extraneous temperature variations, wherefore the relative lengths are not altered and the translating lever is not shifted by any variations in temperature of the surrounding atmosphere. The spring $q$ serves to maintain the tension in both wires $n$ and $p$ so that the angular position of the translating lever will be dependent on their relative lengths.

The clearing circuit of the home and distant signals at the rear end of each block passes, by way of line conductors such as $t$, in series, through all excepting the rearmost of the contacts controlled by all the hot-wire electro-translative devices or relays of such block and also passes through the controlling contact of the rearmost relay in the next advance block. For instance, the clearing circuit of the home signal H is traceable as follows: from one terminal of the signaling current generator P, through the signaling current feeder Q, conductor U², contacts $f^2$, $h^2$ of the rearmost relay of the next advance block, resistance or impedance coil $m^2$, most advance section of the line conductor $t$, contacts $f$, $h$, of the next rear relay, next rear section of the line conductor $t$, contacts $f$, $h$ of the next rear relay, and so on rearward through the successive sections of the line conductor $t$ and through the successive signal-controlling contacts $f$ and $h$ of the successive relays and to the conductor $y$, and thence through the semaphore-actuative mechanism of the signal H and through the ground conductor $x$ to the rail A, and thence by the ground conductor C at the power station back to the opposite terminal of the signaling current generator P.

When no train is present in the first block, the foregoing home-signal clearing circuit will be closed through the series contacts of all its controlling relays, and the home signal H will be cleared. The electro-actuative mechanism of the distant-signal semaphore D is connected directly in parallel with the corresponding actuative mechanism of the home-signal semaphore H, but the distant signal electro-actuative mechanism is only responsive to a signal-clearing current stronger than that current which effects initial clearing of the home-signal semaphore H, the extra strong current required to clear the distant-signal semaphore D being produced in a manner which will be described shortly hereinafter.

If any train is present in the first block, its wheels and axles will establish a short-circuit from rail to rail and will thus effectually short-circuit the secondary coils $s$ of the nearby supply transformers and the primary coils T of the nearby receiving transformers. This condition is represented in the second block occupied by the train N, the wheels and axles of which effectually short-circuit the secondary coils $s^2$ of the nearby supply transformers and the primary coils $T^2$ of the nearby receiving transformers so as to discontinue or reduce the E. M. F. developed in their respective secondary coils $S^2$ and thus discontinue or reduce the heating currents of the electro-translative conductors $n^2$ fed by such secondary coils $S^2$. Such reduction of heating current in the electro-translative tension wire $n^2$ effects a contraction of such translative conductors which swings their respective translating levers about their pivotal axes so as to move their respective contact extensions $f^2$ out of contact with their respective stationary contact pieces $h^2$. But the voltage of the secondary coils $s^2$ of the supply transformers is relatively so low, and the resistance of the primary coils $T^2$ of the receiving transformers is relatively so low, that the resistance of the track rails A and B has sufficient relative value to prevent effectual short-circuiting of current from those secondary supply coils $s^2$ which are connected with the rails in the same block at a sufficient distance from the train, and likewise to prevent effectual short-circuiting of those receiving primary coils $T^2$ which are connected in the same block at points sufficiently distant from the train. The relationship of the voltage delivered to the track rails, resistance of the track rails and the resistance of the primary coils of the receiving transformers, is preferably such that the wheels and axles of a train will not effectually short-circuit more than one or two, or at most a few of the controlling relays which are nearest to such wheels and axles, but will always effectually short-circuit at least one of such relays so as to keep the circuit of the signal-clearing line conductor open so long as a train is present in the block, and, indeed, until the train has passed a short distance beyond the foremost of the transformers which energizes the rearmost relay in the next advance block, since, as already pointed out with respect to the line conductor $t$, the circuit of each line conductor passes through the contacts controlled by the rearmost relay in the next advance block.

When the train N has issued from the advance end of the second block of the diagram and has passed a short distance beyond the foremost of the transformers which energizes the rearmost relay in the next advance block, the home-signal clearing circuit of the line conductor $t^2$ will be completed, as already described with respect to the line conductor $t$ of the first block, and such home-signal clearing circuit of the second block will then cause the home-signal semaphore $H^2$ to assume clear position. The contact lever $j^2$ shown in the diagram just above the home-signal semaphore $H^2$ is connected with such home-signal semaphore so that when the home-signal semaphore clears, the contact lever $j^2$ will make contact with its coöperating contact stop $k^2$ and short-circuit the resistance or impedance coil $m^2$, thus increasing the strength of signal-clearing current in the circuit of the line conductor $t$ so as to clear the distant signal D at the rear end of the first block of the diagram.

It will be obvious that my invention is capable of embodiment in various specific constructions and arrangements other than those particularly illustrated and particularly described in the foregoing specification, all such other embodiments coming, however, fully within the principles and scope of my invention.

What I claim and desire to secure by Letters Patent is:—

1. A railway traffic-controlling system comprising uniformly conductively continuous track rails, current-supply means connected with the track rails to effect potential differentiation therein, electro-translative means also connected with the track rails, conductors extending along the railway, a traffic-controlling apparatus arranged to control movement of a train or railway vehicle when it reaches a given location on the track rails in rear of their rearmost connections to the current-supply and electro-translative means and such traffic-controlling apparatus being controlled by such electro-translative means through said conductors extending along the railway, and said rails including a stretch of conductively continuous track rails extending rearward from such rearmost connections of current-supply and electro-translative means and extending to the aforementioned given train location and having sufficient relative resistance to avoid effective short-circuiting of the electro-translative means by a train at such location.

2. A railway traffic-controlling system comprising a number of sources of electric current connected across the track rails at intervals, a number of electro-translative devices connected across said rails each midway between two of said sources, a traffic-controlling apparatus disposed at a point on the railway in rear of all of said sources and translating devices, and a circuit controlled by said translative devices and controlling said traffic-controlling apparatus.

In testimony whereof I have affixed my signature in presence of two witnesses.

CLYDE J. COLEMAN.

Witnesses:
HENRY D. WILLIAMS,
ALBERT V. T. DAY.

Copies of this patent may be obtained for five cents each, by addressing the "Commissioner of Patents, Washington, D. C."